US010574509B2

(12) United States Patent
Kondapi et al.

(10) Patent No.: US 10,574,509 B2
(45) Date of Patent: Feb. 25, 2020

(54) SYSTEM AND METHOD OF PROVIDING EVENTS VIA OUT-OF-BAND

(71) Applicant: Dell Products L.P., Round Rock, TX (US)

(72) Inventors: Srikanth Kondapi, Austin, TX (US); Nathan F. Martell, Taylor, TX (US); Joseph Kozlowski, Jr., Hutto, TX (US); Abeye Teshome, Austin, TX (US)

(73) Assignee: Dell Products L.P., Round Rock, TX (US)

(*) Notice: Subject to any disclaimer, the term of this patent is extended or adjusted under 35 U.S.C. 154(b) by 174 days.

(21) Appl. No.: 15/588,300

(22) Filed: May 5, 2017

(65) Prior Publication Data

US 2018/0324027 A1 Nov. 8, 2018

(51) Int. Cl.
*H04L 12/24* (2006.01)
*G06F 11/07* (2006.01)

(52) U.S. Cl.
CPC ........ *H04L 41/046* (2013.01); *G06F 11/0706* (2013.01); *G06F 11/0748* (2013.01); *G06F 11/0769* (2013.01); *G06F 11/0781* (2013.01); *G06F 11/0793* (2013.01); *H04L 41/06* (2013.01)

(58) Field of Classification Search
CPC .. H04L 41/06; G06F 11/0748; G06F 11/0781; G06F 11/0769; G06F 11/0793; G06F 11/0706

USPC ........................................................ 709/224
See application file for complete search history.

(56) References Cited

U.S. PATENT DOCUMENTS

| 7,546,487 | B2 * | 6/2009 | Marisetty | ............ G06F 11/0793 |
| | | | | 714/10 |
| 7,627,667 | B1 * | 12/2009 | Rive | ................... G06F 11/0748 |
| | | | | 709/224 |
| 2007/0073633 | A1 * | 3/2007 | Gallant | ................... H04L 41/06 |

OTHER PUBLICATIONS

Distributed Management Task Force, Inc., "Web Services for Management (WS-Management) Specification." (Mar. 3, 2010); 216 pages.

(Continued)

*Primary Examiner* — Kyung H Shin
(74) *Attorney, Agent, or Firm* — Baker Botts L.L.P.

(57) ABSTRACT

In one or more embodiments, one or more systems, method, and/or processes may receive an event from an operating system and provide the event to a management controller configured to perform out-of-band tasks. The management controller may provide information based on the event to at least one subscriber. In one example, the information may include a status of an information handling system (e.g., an impairment, a hardware failure, a progress of an update, etc.). In another example, the management controller may provide information utilizing a protocol that provides a measure of reliability. For instance, the protocol may include a transmission control protocol. In one or more embodiments, the protocol may include one or more of a hypertext transfer protocol (HTTP) and a HTTP secure (HTTPS).

20 Claims, 6 Drawing Sheets

(56) References Cited

OTHER PUBLICATIONS

Distributed Management Task Force, Inc., "System Management BIOS (SMBIOS) Reference Specification." (2017); 149 pages, Jan. 12, 2014.
Hofemeier, Gael et al. "Intel Active Management Technology (Intel AMT)." (2011); 30 pages.
Intel Corporation, "The Intel Management Presence Server (MPS)." (2011); 41 pages.

* cited by examiner

SYSTEM AND METHOD OF PROVIDING EVENTS VIA OUT-OF-BAND

BACKGROUND

Field of the Disclosure

This disclosure relates generally to information handling systems and more particularly to providing events of information handling systems to one or more subscribers.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the past, systems that supported operating system (OS) event monitoring and/or subscription did not persist across system reboots. Moreover, such OS event monitoring utilized protocols such as a simple network management protocol (SNMP), which utilizes a user datagram protocol (UDP), and UDP data packets may not be retransmitted if they are lost. Likewise, OS event monitoring and/or subscription suffered when an event subscriber was behind a firewall. Furthermore, out-of-band functionality was not available to in-band (e.g., OS context) systems.

SUMMARY

In one or more embodiments, one or more systems, methods, and/or processes may receive an event from information handling system firmware and provide data based on the event to at least one subscriber. For example, an embedded controller of an information handling system may receive the event from the information handling system firmware, executed by a processor of the information handling system, and provide the event to a management controller, configured to perform out-of-band tasks, of the information handling system. For instance, the management controller may provide, via at least one out-of-band task, data based on the event to at least one subscriber. In one or more embodiments, providing the data based on the event to the at least one subscriber may include providing the data to the at least one subscriber via at least one of a transmission control protocol (TCP), a hypertext transfer protocol (HTTP), a HTTP secure (HTTPS), a secure socket layer (SSL) protocol, and a transport layer security (TLS) protocol, among others. In one example, the at least one subscriber may be behind at least one firewall. In another example, providing the data based on the event to the at least one subscriber may include providing the data based on the event to the at least one subscriber via web-services management (WS-MAN) alert. In one or more embodiments, the information handling system firmware may receive the event from an operating system via at least one of a Windows Management Interface (WMI) and a Common Information Model (CIM), among others. For example, the event may include a progress update associated with an update to at least one of the operating system and a firmware, among others.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
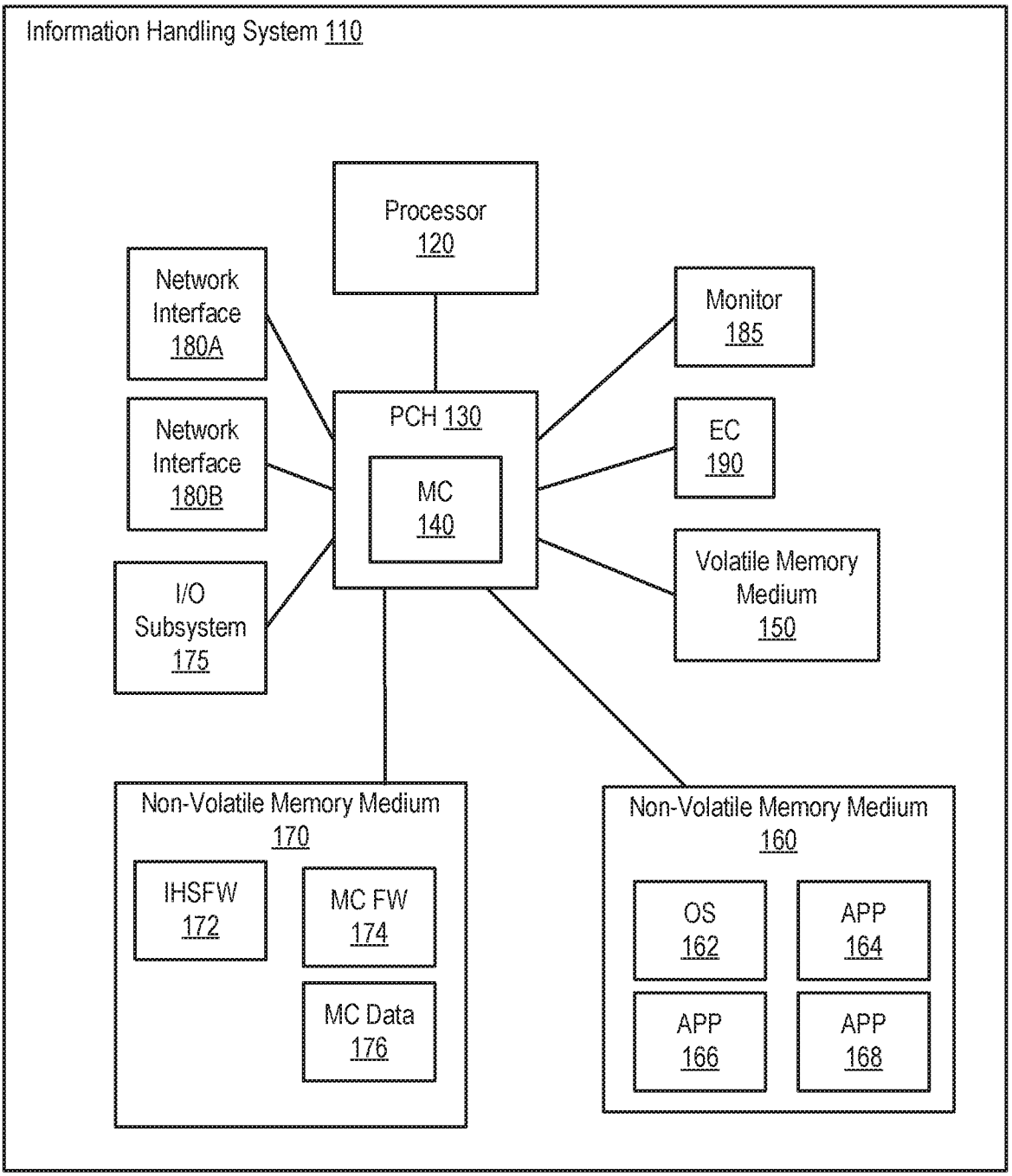
FIG. 1A illustrates an exemplary information handling system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, one or more management consoles may utilize information from events from multiple information handling systems (IHSs). For example, the one or more management consoles may record and/or track information associated with various states of the IHSs. For instance, the one or more management consoles may monitor the IHSs for impairments and/or equipment failures of or associated with the IHSs. In one or more embodiments, the events from the IHSs may be generated via respective operating systems of the IHSs. For example, the operating systems may provide the events to the one or more management consoles via an out-of-band (OOB) system. In one or more embodiments, OOB may mean a processing system within an information handling system (IHS). For example, OOB may be agnostic of an operating system (OS). In one instance, an OS may not be present on an IHS for an OOB system to function. In another instance, a processor (e.g., a CPU) of an IHS may not be powered for an OOB system to function.

In one or more embodiments, the one or more monitoring consoles may be configured to receive information from one or more OOB systems. For example, an IHS may be impaired (e.g., in an impaired state), and an OOB system of the IHS may provide information associated with the impairment to the one or more monitoring consoles. In one instance, the IHS may be impaired due to a hardware failure or impairment. In a second instance, the IHS may be impaired due to an OS failure or impairment. In a third instance, the IHS may be impaired due to information handling system firmware (IHSFW) failure or impairment.

In one or more embodiments, an OS may provide information to one or more management consoles. For example, the OS may utilize IHSFW to utilize OOB system functionality, permitting an in-band (e.g., an OS context) configuration and/or functionality to utilize OOB functionality. For instance, one or more systems, flowcharts, processes, and/or methods described herein may permit an in-band system and/or context to utilized OOB system functionality. In one or more embodiments, permitting an OS to provide messages and/or alerts to one or more management consoles via an OOB system may permit one or more subscriptions to persist across one or more reboots of the OS and/or one or more processor power cycles of an IHS.

Turning now to FIG. 1A, an exemplary information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicating with one or more hard drives, network circuitry, one or more memory devices, one or more I/O devices, and/or one or more other peripheral devices. For example, firmware may include software embedded in an IHS component used to perform tasks. In one or more embodiments, firmware may be stored in non-volatile memory, such as storage that does not lose stored data upon the loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a platform controller hub (PCH) 130, a management controller (MC) 140, a volatile memory medium 150, non-volatile memory media 160 and 170, an I/O subsystem 175, network interfaces 180A and 180B, and an embedded controller (EC) 190. As illustrated, processor 120, volatile memory medium 150, non-volatile memory media 160 and 170, I/O subsystem 175, network interfaces 180A and 180B, and EC 190 may be communicatively coupled to PCH 130. In one or more embodiments, PCH 130 may transfer information between or among two or more of processor 120, volatile memory medium 150, non-volatile memory media 160 and 170, I/O subsystem 175, and network interfaces 180A and 180B, among others not specifically illustrated. In one or more embodiments, one or more of processor 120, volatile memory medium 150, non-volatile memory media 160 and 170, I/O subsystem 175, and network interfaces 180A and 180B, among others not specifically illustrated, may be communicatively coupled to one-another via one or more PCI-Express (PCIe) root complexes and/or one or more PCIe switches.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate over a network utilizing a suitable transmission protocol and/or standard. In a second example, network interface 180A may be coupled to a wired network. In a third example, network interface 180A may be coupled to an optical network. In another example, network interface 180B may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an OS 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172, MC firmware (FW) 174, and MC data 176. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. In one or more embodiments, MC FW 174 may include MC processor instructions that are executable by a MC processor of MC 140.

In one or more embodiments, one or more of MC 140 and EC 190 may be or include a microcontroller. In one example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In another example, MC 140 may be or include an Intel® Management Engine (ME). For instance, MC FW 174 may include ME firmware that may be utilized by MC 140 in implementing Intel® Active Management Technology (AMT) functionality. In one or more embodiments, one or more of MC 140 and EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

In one or more embodiments, monitor 185 may monitor one or more components of IHS 110. In one example, monitor 185 may monitor one or more of processor 120, volatile memory medium 150, non-volatile memory media 160 and 170, I/O subsystem 175, network interfaces 180A and 180B, and EC 190, among others. In another example, monitor 185 may monitor one or more of a fan, a temperature of a component, a humidity sensor, a temperature sensor, an accelerometer, and a magnetometer, among others, of IHS 110 not specifically illustrated. In one or more embodiments, monitor 185 may be configured in a "bare-metal" fashion. In one example, monitor 185 may be configured without one or more of an operating system and a task and/or process scheduler, among others. In another example, monitor 185 may be configured with a state machine. For instance, a transition from a first state of the state machine to a second state of the state machine may occur in response to a malfunction or impairment of the fan and/or one or more outputs from one or more of the temperature of the component, the humidity sensor, the temperature sensor, the accelerometer, and the magnetometer, among others.

Figure 1B:
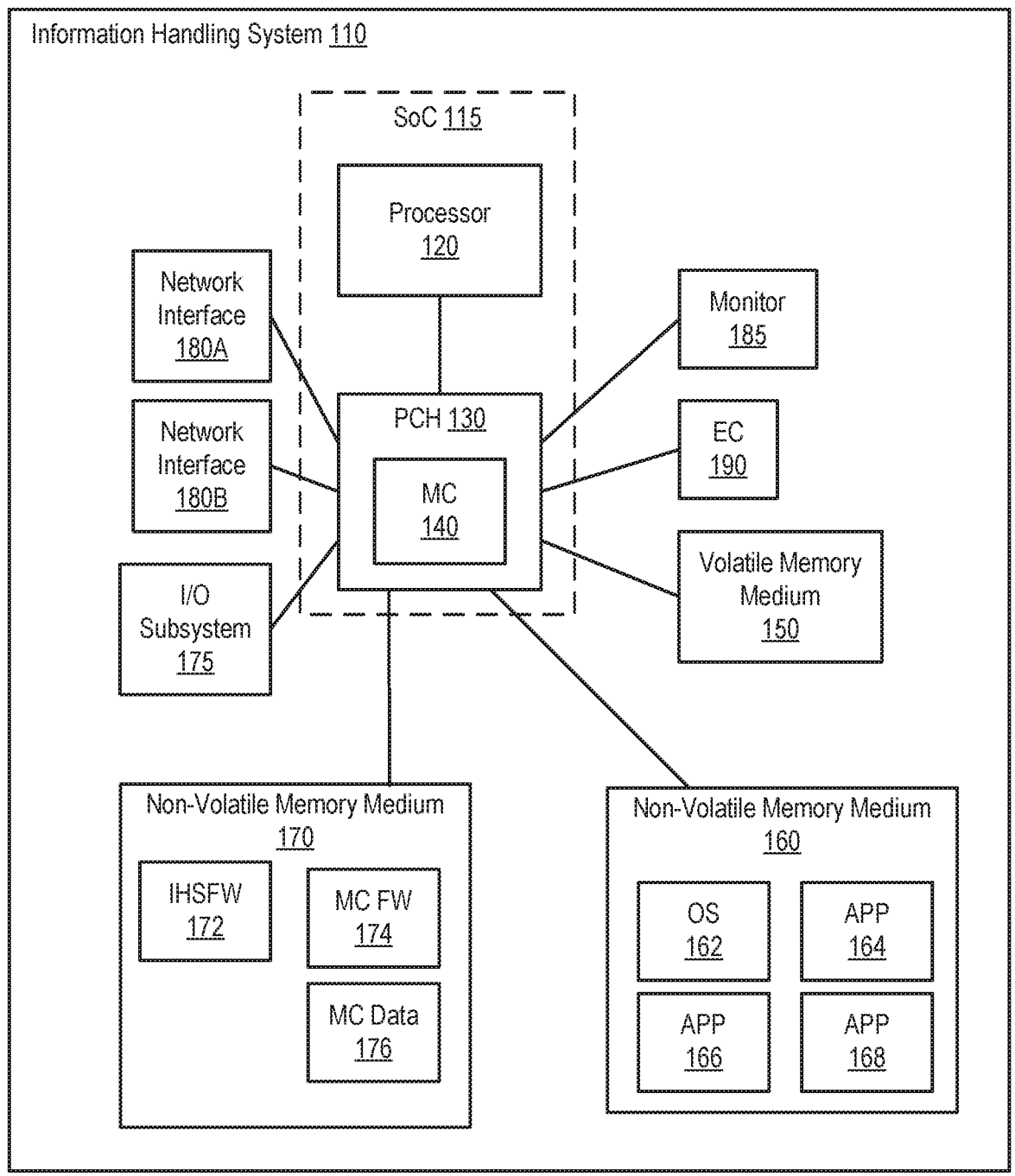
FIG. 1B illustrates an exemplary information handling system that is configured with a system-on-chip, according to one or more embodiments.

In one or more embodiments, processor 120 and PCH 130, among others, may be included in a system-on-chip (SoC). For example, as illustrated in FIG. 1B, a SoC 115 may include processor 120, PCH 130 and management controller (MC) 140.

Figure 2:
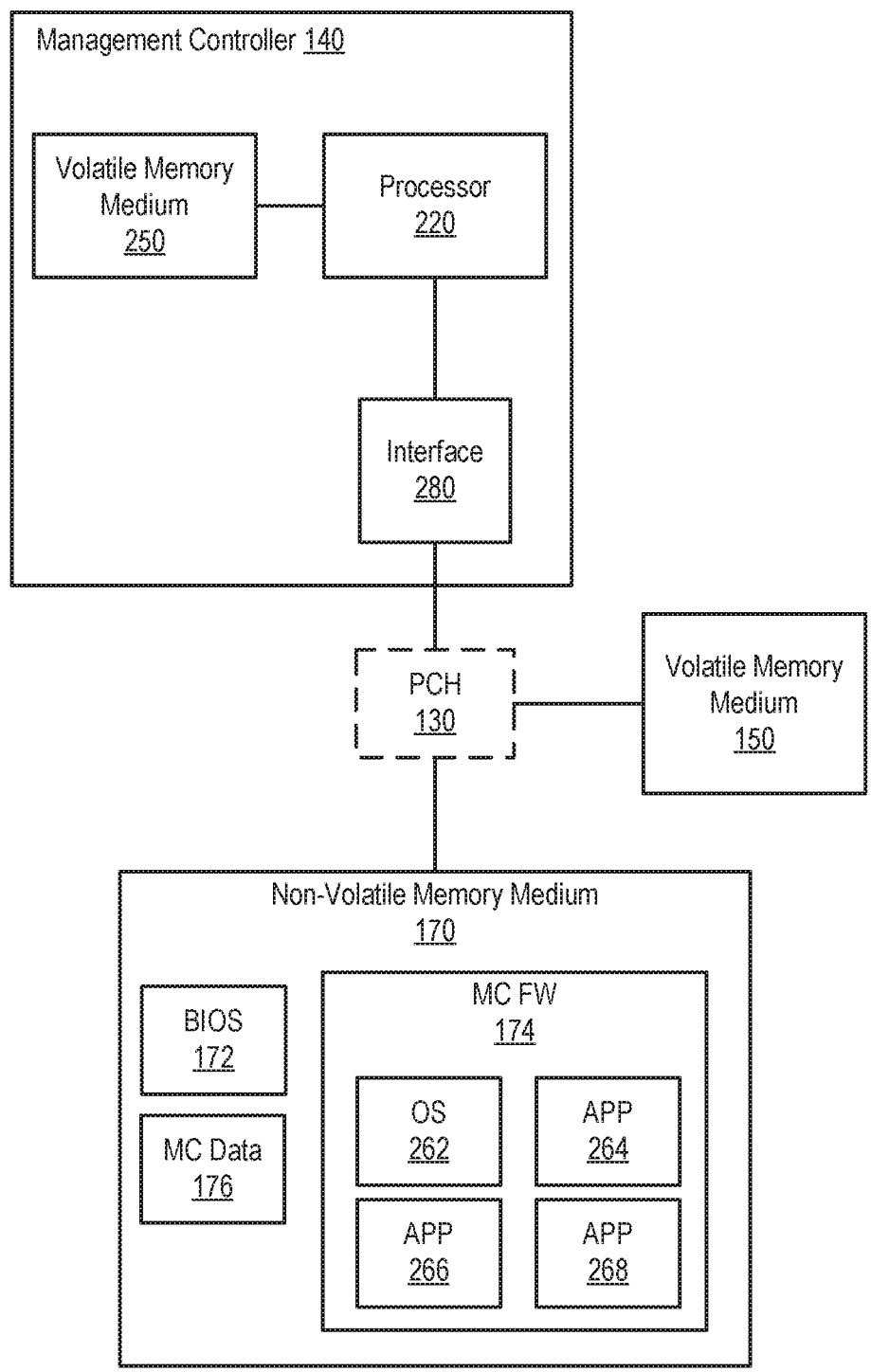
FIG. 2 illustrates an exemplary management controller, according to one or more embodiments.

Turning now to FIG. 2, an exemplary management controller is illustrated, according to one or more embodiments. As shown, MC 140 may include a processor 220, a volatile memory medium 250, and an interface 280. As illustrated, volatile memory medium 250 and interface 280 may be communicatively coupled to processor 220. In one or more embodiments, volatile memory medium 250 may include one or more structures and/or functionalities as those described with reference to volatile memory medium 150.

In one or more embodiments, processor 220 may be communicatively coupled to one or more of memory media 150 and 170 via interface 280 and PCH 130. For example, processor 220 may access one or more of IHSFW 172, MC FW 174, and MC data 176 via interface 280 and PCH 130.

As shown, MC FW 174 may include an OS 262 and APPs 264-268. For example, OS 262 may be or include a real-time operating system (RTOS). In one or more embodiments, one or more of OS 262 and APPs 264-268 may include processor instructions executable by processor 220. In one example, processor 220 may execute processor instructions of one or more of OS 262 and APPs 264-268 via non-volatile memory medium 170. In a second example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In another example, one or more portions of the processor instructions of the one or more of OS 262 and APPs 264-268 may be transferred to volatile memory medium 150, and processor 220 may execute the one or more portions of the processor instructions of the one or more of OS 262 and APPs 264-268 via volatile memory medium 150.

In one or more embodiments, processor 220 may utilize MC Data 176. In one example, processor 220 may utilize MC data 176 via non-volatile memory medium 170. In a second example, one or more portions of MC data 176 may be transferred to volatile memory medium 250, and processor 220 may utilize MC data 176 via volatile memory medium 250. In another example, one or more portions of MC data 176 may be transferred to volatile memory medium 150, and processor 220 may utilize MC data 176 via volatile memory medium 150.

In one or more embodiments, MC 140 may be utilized in implementing a system and/or service that may provide OOB management of IHS 110. In one example, an OOB system may include one or more of MC 140, MC FW 174, and MC data 176, among others. In a second example, IHS 110 may be managed remotely via MC 140, regardless of power applied to processor 120 and/or regardless of any functionality of OS 162. For instance, IHS 110 may be managed remotely via MC 140 when no power is applied to processor 120 and/or when OS 162 is not functioning or is not installed. In another example, an application (APP) may be utilized to remotely setup, configure, monitor, maintain, upgrade, and/or repair multiple end points (e.g., computer systems that include one or more functionalities and/or one or more structures as those described with reference to IHS 110). For instance, the APP may be utilized to perform remotely perform enterprise setup, configuration, monitoring, maintenance, upgrades, and/or repairs.

Figure 3:
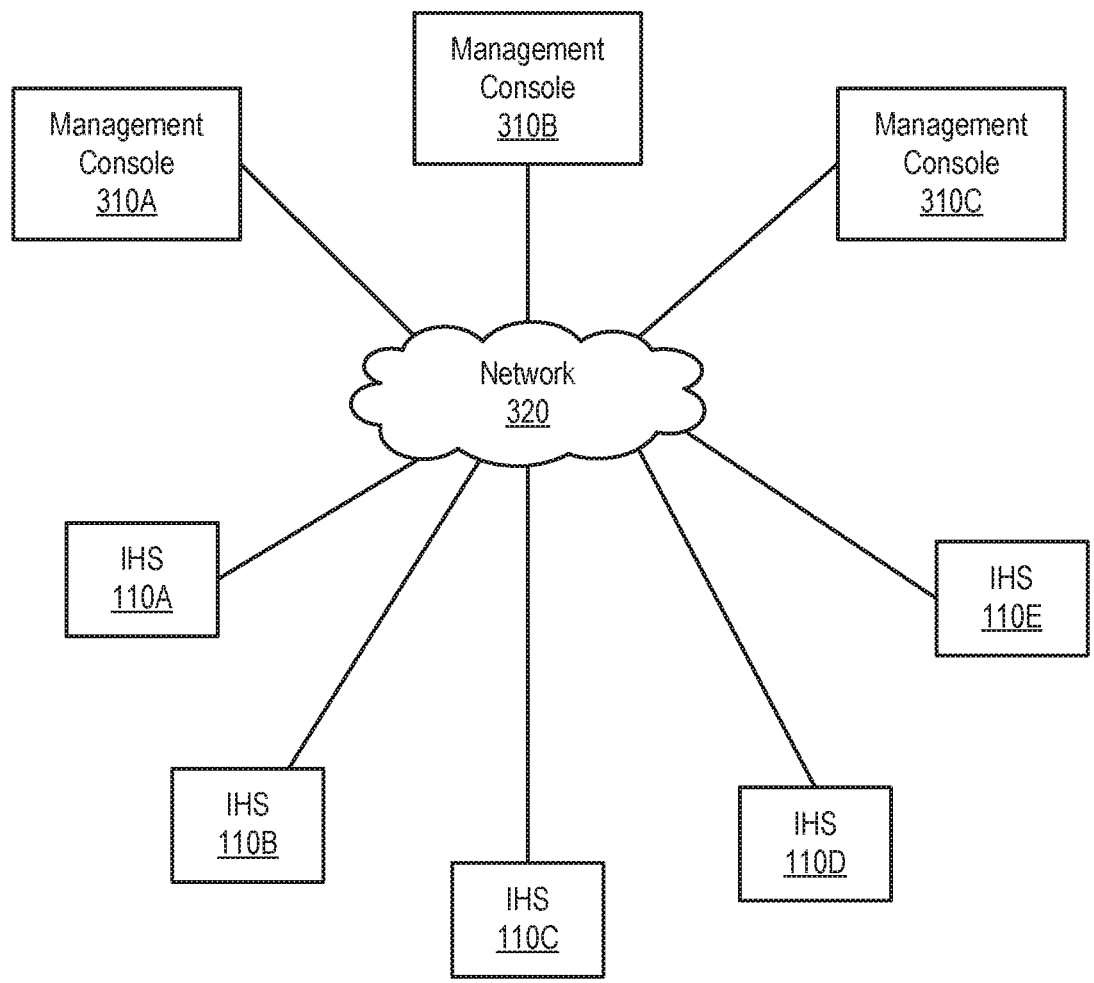
FIG. 3 illustrates an exemplary computing environment, according to one or more embodiments.

Turning now to FIG. 3, an exemplary computing environment is illustrated, according to one or more embodiments. As shown, IHSs 110A-110E and management consoles 310A-310C may be coupled to a network 320. In one or more embodiments, network 320 may include a wired network, a wireless network, an optical network, or a combination of the foregoing, among others. For example, network 320 may include and/or be coupled to various types of communications networks. For instance, network 320 may include and/or be coupled to a local area network (LAN), a wide area network (WAN) (e.g., a private WAN, a corporate WAN, a public WAN, etc.), an Internet, a public switched telephone network (PSTN), a cellular telephone network, a satellite telephone network, or a combination of the foregoing, among others. In one or more embodiments, each of one or more of management consoles 310A-310C may include one or more structures and/or functionalities as those described with reference to IHS 110.

In one or more embodiments, one or more of management consoles 310A-310C may subscribe to events of one or more of IHSs 110A-110E. For example, management console 310C may subscribe to OS events of IHSs 110B and 110E. For instance, the OS events may include one or more of an anti-virus information indicating that anti-virus rules are out-of-date, authentication failure information (e.g., authentication failures logged via security software), an alert indicating that at least one of a processor utilization and a memory utilization is above a respective threshold, and an abnormality alert, among others. In one or more embodiments, a management console (e.g., a management console of management consoles 310A-310C) may utilize data of the events. In one example, the management console may store the data of the events. For instance, the management console may store the data of the events via a database. In another example, the management console may provide one or more messages to one or more other computer systems and/or to one or more users (e.g., administrators). In one instance, the management console may provide one or more electronic messages (e.g., emails addressed to one or more services and/or applications, emails addressed to one or more users, etc.) to one or more other computer systems. In another instance, the management console may provide one or more alerts to one or more users (e.g., administrators) via one or more simple messaging service (SMS) messages.

Figure 4:
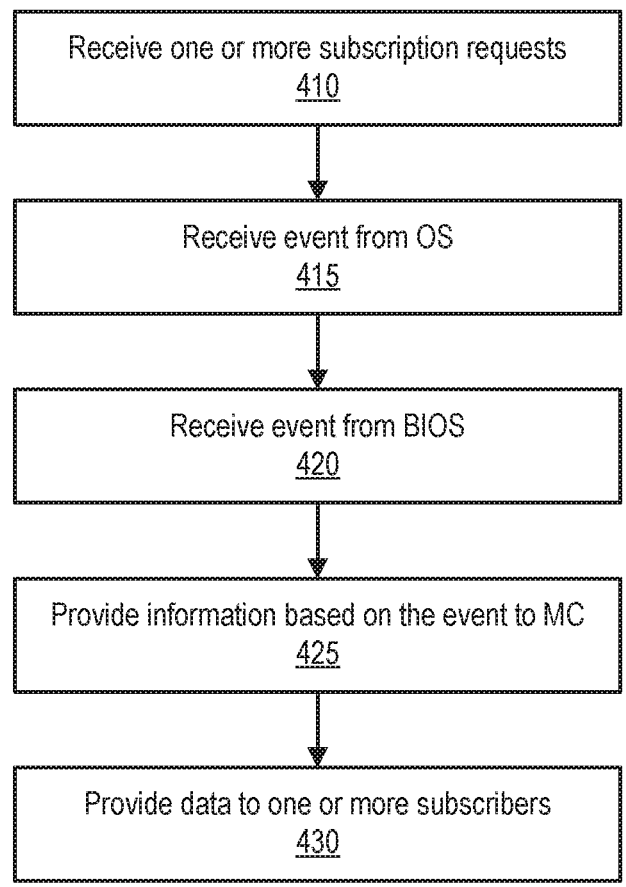
FIG. 4 provides an exemplary method of utilizing an event service, according to one or more embodiments.

Turning now to FIG. 4, an exemplary method of utilizing an event service is illustrated, according to one or more embodiments. At 410, one or more subscription requests may be received. For example, an IHS of IHSs 110A-110E may receive one or more subscription requests from one or more of management consoles 310A-310C. For instance, MC 140 may receive the one or more subscription requests from the one or more of management consoles 310A-310C. In one or more embodiments, one or more management consoles 310A-310C may subscribe to events from one or more of IHSs 110A-110E to record and/or track information associated with various states of the one or more of IHSs 110A-110E. In one example, the one or more management consoles 310A-310C may subscribe to specific events from one or more of IHSs 110A-110E. In another example, management console 310B may subscribe to progress updates from IHSs 310B and 310D. For instance, the progress updates may include information associated with a progress of an upgrade to an OS and/or a firmware.

At 415, an event from an OS may be received. For example, IHSFW 172 may receive the event from OS 162. In one or more embodiments, one or more arguments may be received by IHSFW 172, along with the event, that indicate that a payload of an IHSFW command is an OS event. For example, the arguments may include configuring specific values in cbClass and cbSelect arguments in the IHSFW command to indicate that the payload of the command includes the OS event. For instance, the IHSFW command indicating that the payload of the command includes the OS event may permit the IHSFW 172 to determine that the OS event is to be provided to EC 190. In one or more embodiments, the OS event may include one or more of a message identification (ID) and a message, among others. For example, an OS agent may generate the event that includes a message ID and a message. In one instance, a message ID may be utilized in identifying a vendor. In another instance, the message may include zero or more arguments.

At 420, the event from the OS may be received from the IHSFW. For example, EC 190 may receive the event from OS 162. In one or more embodiments, OS 162 may provide the event to EC 190 via IHSFW 172. For example, OS 162 may utilize a management information exchange in providing the event to IHSFW 172. In one or more embodiments, OS 162 may include the management information exchange. In one example, the management information exchange may permit multiple components to exchange management information associated with managed elements and/or may permit control and/or management of the managed elements. In another example, the management information exchange may a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, OS 162 may utilize at least one of WMI and CIM, among others, in providing the event to IHSFW 172.

At 425, information based on the event may be provided to a MC. For example, EC 190 may provide the information based on the event to MC 140. For instance, the information based on the event may include one or more of the message ID and the message, among others. At 430, data may be provided to one or more subscribers. For example, MC 140 may provide the data to the one or more management consoles 310A-310C that subscribed to events from the IHS. For instance, the data may include a status of the IHS (e.g., an impairment, a hardware failure, a progress of an update, etc.).

In one or more embodiments, the data provided to the one or more subscribers may be based on the information based on the event. For example, the data provided to the one or more subscribers may include the message ID and the message, among others. In one instance, IHS 110B may provide one or more progress updates to management console 310B. In a second instance, IHS 110B may not provide one or more progress updates to management console 310C, as management console 310C did not subscribe to progress alerts from IHS 110B. In another instance, alerts may be provided to one or more subscribers via one or more web-services management (WS-MAN) alerts.

In one or more embodiments, providing the information to the one or more subscribers may include utilizing a protocol that provides a measure of reliability. For example, the protocol may include a transmission control protocol (TCP). For instance, providing the information to the one or more subscribers may include utilizing one or more of a hypertext transfer protocol (HTTPS), a HTTP secure (HTTPS), a secure socket layer (SSL) protocol, and a transport layer security (TLS) protocol, among others, via TCP.

In one or more embodiments, one or more of IHSs 110A-110E may be outside a secure computer environment. For example, the secure computer environment may be behind one or more firewalls. For instance, the secure computing environment may include one or more of management consoles 310A-310C, and one or more of IHSs 110A-110E outside the secure computer environment may provide, via an OOB system, one or more OS events to the one or more of management consoles 310A-310C included in the secure computing environment.

In one or more embodiments, the IHS may be outside a secure computer environment and the one or more subscribers may be included in the secure computer environment. For example, providing the information to the one or more subscribers may include providing the information to the one or more subscribers via a secure protocol. For instance, MC 140 may utilize one or more of HTTPS, SSL, and TLS in providing one or more OS events to the one or more subscribers included in the secure computer environment.

Figure 5:
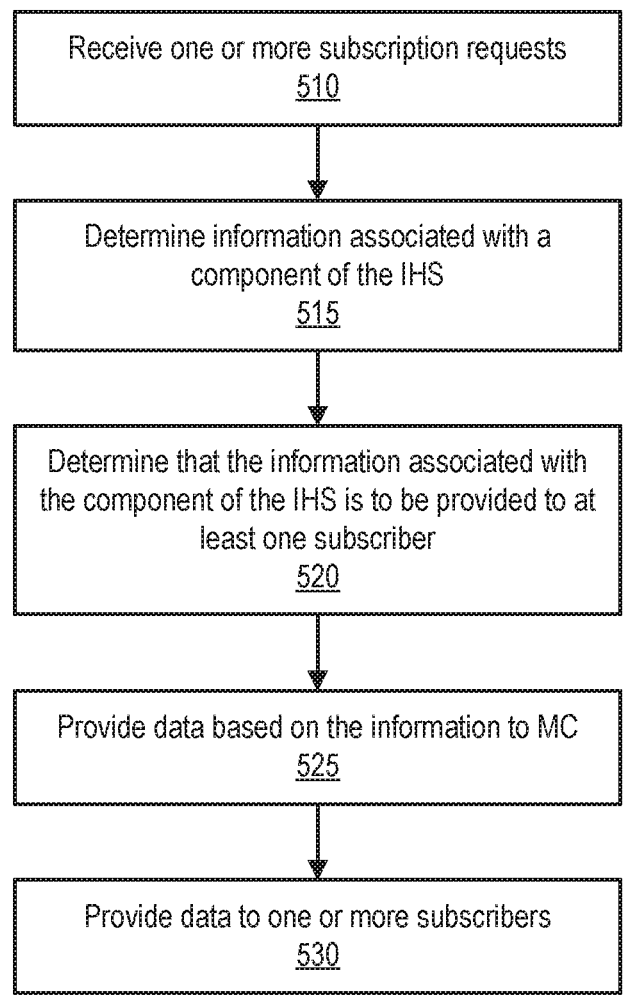
FIG. 5 provides another exemplary method of utilizing an event service, according to one or more embodiments.

Turning now to FIG. 5, another exemplary method of utilizing an event service is illustrated, according to one or more embodiments. At 510, one or more subscription requests may be received. For example, an IHS of IHSs 110A-110E may receive one or more subscription requests from one or more of management consoles 310A-310C. For instance, MC 140 may receive the one or more subscription requests from the one or more of management consoles 310A-310C. In one or more embodiments, one or more management consoles 310A-310C may subscribe to events from one or more of IHSs 110A-110E to record and/or track information associated with various states of the one or more of IHSs 110A-110E. For example, the one or more management consoles 310A-310C may subscribe to information associated with one or more components of one or more IHSs.

At 515, a monitor may determine information associated with a component of the IHS. For example, monitor 185 may determine information associated with a fan, a temperature of a component, a humidity sensor, a temperature sensor, an accelerometer, or a magnetometer, among others, of IHS 110. In one instance, determining the information may include receiving the information from the fan, the temperature of the component, the humidity sensor, the temperature sensor, the accelerometer, or the magnetometer, among others, of IHS 110. In another instance, determining the information may include processing the received information.

At 520, the monitor may determine that the information associated with the component of the IHS is to be provided to at least one subscriber. For example, monitor 185 may determine that the information associated with the component of the IHS is to be provided to at least one subscriber. In one instance, determining that the information associated with the component of the IHS is to be provided to at least one subscriber may include determining that the information associated with the component of the IHS is outside a threshold. In another instance, determining that the information associated with the component of the IHS is to be provided to at least one subscriber may include determining that the information associated with the component of the IHS is within a threshold.

At 525, data based on the information associated with the component of the IHS may be provided to a MC. For example, monitor 185 may provide data based on the information associated with the component of the IHS to MC 140. At 530, data may be provided to one or more subscribers. For example, MC 140 may provide the data to the one or more management consoles 310A-310C that subscribed events from the IHS. For instance, the data may be provided to one or more subscribers via one or more WS-MAN alerts. In one or more embodiments, providing the data to the one or more subscribers may include utilizing a protocol that provides a measure of reliability. For example, the protocol may include a TCP. For instance, providing the data to the one or more subscribers may include utilizing one or more of a HTTPS, a HTTPS, a SSL protocol, and a TLS protocol, among others, via TCP.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a processor;
   an embedded controller communicatively coupled to the processor;
   a management controller configured to perform out-of-band tasks independently of the processor, wherein the management controller is communicatively coupled to the processor and to the embedded controller; and
   a memory communicatively coupled to the processor;
   wherein the memory stores instructions, executable by the processor, that include information handling system firmware;
   wherein as the processor executes the instructions, the information handling system firmware receives an event from an operating system of the information handling system;
   wherein the embedded controller receives the event from the information handling system firmware;
   wherein the embedded controller provides the event to the management controller; and
   wherein the management controller provides, via at least one out-of-band task, data based on the event to at least one subscriber based on a subscription to events received by the management controller, wherein the subscription persists across one or more of a reboot of an operating system (OS) and a processor power cycle.

2. The information handling system of claim 1, wherein a subscription to an information handling system comprises one or more of recording and tracking information associated with a state of the information handling system.

3. The information handling system of claim 2, wherein the information handling system firmware receiving the event from the operating system comprises the information handling system firmware receiving a command from the operating system, wherein a payload of the command indicate that the command comprises an operating system event.

4. The information handling system of claim 3, wherein the operating system event includes data, wherein the data comprises one or more of a progress update associated with an update to at least one of the operating system and a firmware, an impairment and a hardware failure.

5. The information handling system of claim 1, wherein when the management controller sending the data based on the event to the at least one subscriber includes a status of the information handling system.

6. The information handling system of claim 5, wherein the management controller sending the data based on the event to the at least one subscriber comprises a message identification (ID).

7. The information handling system of claim 5, wherein the at least one subscriber is behind at least one firewall.

8. The information handling system of claim 1,
   wherein the information handling system is in an impaired state; and
   wherein the data from the event indicates that the information handling system has an impaired status.

9. The information handling system of claim 1, wherein the management controller receives a subscription request from the at least one subscriber.

10. The information handling system of claim 1, wherein the information handling system firmware includes one or more structures and/or functionalities of one or more of a basic input/output system (BIOS), an Extensible Firmware Interface (EFI), a Unified Extensible Firmware Interface (UEFI), and an Advanced Configuration and Power Interface (ACPI).

11. A method of operating an information handling system, comprising:
- receiving, by a management controller, a request from at least one subscriber for a subscription to events received by the management controller, wherein the subscription persists across one or more of a reboot of an operating system (OS) and a processor power cycle;
- information handling system firmware, executed by a processor of the information handling system, receiving an event associated with an operating system executed by a processor of the information handling system;
- an embedded controller of the information handling system receiving the event from the information handling system firmware;
- the embedded controller sending the event to the management controller of the information handling system, wherein the management controller is configured to perform out-of-band tasks performed independently of the processor; and
- the management controller sending data based on the event to the at least one subscriber.

12. The method of claim 11, wherein a subscription to an information handling system comprises one or more of recording and tracking information associated with a state of the information handling system.

13. The method of claim 12, wherein the information handling system firmware receiving the event from the operating system comprises:
- receiving a command from the operating system, wherein a payload of the command indicate that the command comprises an operating system event.

14. The method of claim 13, wherein the operating system event includes data, wherein the data comprises one or more of a progress update associated with an update to at least one of the operating system and a firmware, an impairment and a hardware failure.

15. The method of claim 11, wherein the management controller sending the data based on the event to the at least one subscriber includes a status of the information handling system.

16. The method of claim 15, wherein the providing the data based on the event to the at least one subscriber comprises a message identification (ID).

17. The method of claim 15, wherein the at least one subscriber is behind at least one firewall.

18. The method of claim 11,
- wherein the information handling system is in an impaired state; and
- wherein the data from the event indicates that the information handling system has an impaired status.

19. The method of claim 11, further comprising:
- the management controller receiving a subscription request from the at least one subscriber.

20. The method of claim 11, wherein the information handling system firmware includes one or more structures and/or functionalities of one or more of a basic input/output system (BIOS), an Extensible Firmware Interface (EFI), a Unified Extensible Firmware Interface (UEFI), and an Advanced Configuration and Power Interface (ACPI).

* * * * *